United States Patent
Endo et al.

(10) Patent No.: US 8,329,828 B2
(45) Date of Patent: Dec. 11, 2012

(54) HEAT-SHRINKABLE POLYESTER FILM AND PROCESS FOR PRODUCING THE SAME

(75) Inventors: Takuro Endo, Inuyama (JP); Masatoshi Hashimoto, Inuyama (JP); Katsuhiko Nose, Osaka (JP)

(73) Assignees: Toyo Boseki Kabushiki Kaisha, Osaka-shi (JP); Fuji Seal International Inc., Osaka-shi (JP)

( * ) Notice: Subject to any disclaimer, the term of this patent is extended or adjusted under 35 U.S.C. 154(b) by 357 days.

(21) Appl. No.: 12/746,870

(22) PCT Filed: Dec. 11, 2008

(86) PCT No.: PCT/JP2008/072541
§ 371 (c)(1),
(2), (4) Date: Jun. 8, 2010

(87) PCT Pub. No.: WO2009/075333
PCT Pub. Date: Jun. 18, 2009

(65) Prior Publication Data
US 2010/0256309 A1    Oct. 7, 2010

(30) Foreign Application Priority Data

Dec. 13, 2007 (JP) ................................ 2007-322411
Nov. 27, 2008 (JP) ................................ 2008-302973

(51) Int. Cl.
*C08G 63/00* (2006.01)
(52) U.S. Cl. ................. 525/444; 528/308.1; 264/176.1; 428/34.9

(58) Field of Classification Search .................. 525/444; 528/308.1; 264/176.1; 428/34.9
See application file for complete search history.

(56) References Cited

U.S. PATENT DOCUMENTS

| | | | |
|---|---|---|---|
| 7,001,651 B2 * | 2/2006 | Hayakawa et al. | 428/34.9 |
| 7,128,863 B2 * | 10/2006 | Kim et al. | 264/210.8 |
| 2009/0270584 A1 * | 10/2009 | Endo et al. | 528/308.1 |

FOREIGN PATENT DOCUMENTS

| | | |
|---|---|---|
| EP | 0 097 108 A1 | 6/1983 |
| EP | 1 577 116 A1 | 9/2005 |
| JP | 09-239833 A | 9/1997 |
| JP | 2002-332394 A | 11/2002 |
| JP | 2003-170498 A | 6/2003 |
| JP | 2004-142126 A | 5/2004 |

(Continued)

OTHER PUBLICATIONS

European Patent Office, Extended European Search Report in European Patent Application No. 08858428.9 (Oct. 14, 2011).

(Continued)

*Primary Examiner* — Alicia Toscano
(74) *Attorney, Agent, or Firm* — Leydig, Voit & Mayer, Ltd.

(57) ABSTRACT

A heat-shrinkable polyester film is provided which exhibits a high shrinkability in a high-temperature range with a main shrinking direction oriented in a longitudinal direction thereof, though not shrinking in the longitudinal direction in a low-temperature range, possesses an extremely high mechanical strength in a transverse direction orthogonal to the main shrinking direction, and, in particular, can be utilized suitably as a film for forming a jacket label of a battery or in similar applications.

10 Claims, 2 Drawing Sheets

FOREIGN PATENT DOCUMENTS

| | | |
|---|---|---|
| JP | 2005-171127 A | 6/2005 |
| JP | 2007-016120 A | 1/2007 |
| JP | 2007-056156 A | 3/2007 |
| JP | 2007-203652 A | 8/2007 |
| WO | 99/62982 A1 | 12/1999 |

OTHER PUBLICATIONS

State Intellectual Property Office of People's Republic of China, First Office Action in Chinese Patent Application No. 200880120547.8 (Jul. 24, 2012).

* cited by examiner

PIERCING OF CHISEL  CUT

TRANSVERSE DIRECTION

HEAT-SHRINKABLE POLYESTER FILM AND PROCESS FOR PRODUCING THE SAME

TECHNICAL FIELD

The present invention relates to heat-shrinkable polyester films and processes for producing the same, and particularly to a heat-shrinkable polyester film which is suitable for use in a jacket label of a battery or similar applications and a process for producing the same.

BACKGROUND ART

In recent years, the heat-shrinkable polyester film has become widely utilized for label package, etc. of PET bottles, glass containers and the like for the purposes of improving the outward appearances thereof, protecting the contents thereof and indicating the merchandise therein. The heat-shrinkable polyester film needs to have a large transversely shrinkable property; thus, its production, in many instances, involves stretching which may be conducted in a mainly transverse limited direction (Patent Document 1).
Patent Document 1: JP 9-239833 A

DISCLOSURE OF THE INVENTION

Problems to be Solved by the Invention

Recently, a heat-shrinkable polyester film having a thermosensitive adhesive laminated thereon has been used for the jacket of a battery. When such a heat-shrinkable polyester film on which a thermosensitive adhesive is laminated is attached to the outside of the battery, the process to be adopted typically includes: winding the film around the outside of the battery by making use of a drum heated at 70° C. to 110° C. (barrel wrapping); then, fusing the thermosensitive adhesive at its overlapped portion (to thermally seal that portion), so that the film is loosely wound around the outside of the battery; thereafter heating the battery to approximately 140° C. to cause the film to thermally shrink, thereby making the film tightly wrapped around the outside of the battery. However, the film stretched only in the transverse direction as disclosed in Patent Document 1 has a shrinkage ratio and a thermal shrinkage stress too high in the low temperature range spanning approximately 60° C.-80° C. to disadvantageously cause the film to shrink while winding the film around the battery by making use of a heated drum, thus resulting in a poor finish of shrinkage in the final state of the thermally shrunk film.

Moreover, when a label is attached to a cylindrical member such as a battery, the label should be made into an annular form, attached to the cylindrical member and then caused to thermally shrink in its circumferential direction. Accordingly, if the heat-shrinkable film thermally shrinkable in the transverse direction is used as such a label, the film should be made into an annularly-shaped member such that the transverse direction of the film is aligned with its circumferential direction, and then the annularly-shaped member should be cut into segments having a predetermined length and each segment should be attached to the cylindrical member. Therefore, such a label composed of a heat-shrinkable film thermally shrinkable in the transverse direction is difficult to attach to the cylindrical member at high speed. For that reason, recently, there is a need to provide a film which is thermally shrinkable in a longitudinal direction and thus can be supplied from a film roll directly and attached to the peripheral surface of the cylindrical member (i.e., wrapped around the barrel), and the film stretched only in the transverse direction as disclosed in Patent Document 1 cannot fulfill this need.

In addition, the film stretched only in the transverse direction as disclosed in Patent Document 1 is low in mechanical strength in the longitudinal direction, and is disadvantageously liable to rupture while it is treated.

It is an object of the present invention to provide a heat-shrinkable polyester film, which overcomes the aforementioned problems associated with the conventional heat-shrinkable polyester film, exhibiting a high shrinkability in a high-temperature range (approximately 130° C.-150° C.) with a main shrinking direction oriented in a longitudinal direction thereof, though not shrinking in the longitudinal direction in a low-temperature range (approximately 60° C.-80° C.), possessing an extremely high mechanical strength in the main shrinking direction and the transverse direction, thus unlikely to rupture while it is treated, and can be utilized suitably as a film for forming a jacket label of a battery or similar applications.

Means for Solving the Problems

Among several aspects of the present invention, the invention as recited in claim 1 relates to a heat-shrinkable polyester film made of a polyester resin comprising ethylene terephthalate as a major constituent and containing at least one monomer component capable of forming an amorphous component with a monomer component content in a glycol component being neither less than 1 mol % nor more than 12 mol %, wherein the heat-shrinkable polyester film shaped to extend longitudinally with a specific transverse dimension has a main shrinking direction oriented in a longitudinal direction thereof, and satisfies the following requirements (1)-(3):

(1) a ratio of hot-water shrinkage in the longitudinal direction is more than or equal to 0% but not more than 5% where treatment spans 10 seconds in hot water at 80° C.;

(2) a ratio of shrinkage in the longitudinal direction is more than or equal to 30% but not more than 50% where treatment spans 10 seconds in a glycerin bath heated at 140° C.; and (3) a ratio of shrinkage in a transverse direction orthogonal to the longitudinal direction is more than or equal to −5% but not more than 10% where treatment spans 10 seconds in a glycerin bath heated at 140° C.

The invention as recited in claim 2, premised on the invention recited in claim 1, relates to the feature that the monomer component capable of forming an amorphous component contains at least one of neopentyl glycol, 1,4-cyclohexanedimethanol and isophthalic acid.

The invention as recited in claim 3, premised on the invention recited in claim 1, relates to the feature that an index of refraction in the longitudinal direction is more than or equal to 1.600 but not more than 1.630, and an index of refraction in the transverse direction is more than or equal to 1.620 but not more than 1.650.

The invention as recited in claim 4, premised on the invention recited in claim 1, relates to the feature that a maximum thermal shrinkage stress acting in the longitudinal direction responsive to heating from 30° C. to 140° C. is more than or equal to 2.5 MPa but not more than 20.0 MPa.

The invention as recited in claim 5, premised on the invention recited in claim 1, relates to the feature that a ratio of natural shrinkage after aging for a 700-hour or longer period of time in an atmosphere of 40° C.65% RH is more than or equal to 0.05% but not more than 1.5%.

The invention as recited in claim 6 relates to a process for continuously producing the heat-shrinkable polyester film as recited in any one of claims 1-5, the process comprising: stretching an unstretched film, of which both edges facing in the transverse directions are held by clips in a tenter, by a factor of neither less than 1.8 nor more than 6.0 in the transverse direction at a temperature of neither lower than Tg nor higher than Tg+40° C.; then, passing the film through an intermediate zone in which no active heating operation is carried out; subjecting the film to a heat treatment at a temperature higher than or equal to 90° C. but not higher than 130° C. for a period of time longer than or equal to 1.0 second but not longer than 10.0 seconds; thereafter, cooling the film until a surface temperature thereof falls to a temperature higher than or equal to 30° C. but not higher than 70° C.; trimming portions at the both edges of the film facing in the transverse directions and held by the clips; then, stretching the film by a factor of neither less than 1.5 nor more than 4.0 in the longitudinal direction at a temperature of neither lower than Tg nor higher than Tg+80° C.; and thereafter, subjecting the film, of which both edges facing in the transverse directions are held by clips in a tenter, to a heat treatment at a temperature higher than or equal to 110° C. but not higher than 160° C. for a period of time longer than or equal to 1.0 second but not longer than 10.0 seconds.

Advantageous Effects of the Invention

The heat-shrinkable polyester film according to the present invention exhibits a high shrinkability in a high-temperature range (130° C.-150° C.) with a main shrinking direction oriented in a longitudinal direction thereof, though not shrinking in the longitudinal direction in a low-temperature range (60° C.-80° C.), possesses an extremely high mechanical strength in the main shrinking direction and the transverse direction, is thus unlikely to rupture while it is treated. Therefore, it can be utilized suitably as a film for forming a jacket label of a battery or similar applications, can be wound around a battery very efficiently within a short period of time, and can exhibit a good finish, when the thus-wound film is thermally shrunk, such that wrinkles resulting from thermal shrinkage and insufficiently shrunk portions are considerably reduced. Furthermore, with the process for producing a heat-shrinkable polyester film according to the present invention, the heat-shrinkable polyester film that does not shrink in the longitudinal direction in the low-temperature range but exhibits a high shrinkability in the high-temperature range, and possesses an extremely high mechanical strength in the transverse direction orthogonal to the main shrinking direction can be produced efficiently and inexpensively.

BEST MODE(S) FOR CARRYING OUT THE INVENTION

The polyester resin for use in the heat-shrinkable polyester film according to the present invention needs to comprise ethylene terephthalate as a major constituent.

Examples of dicarboxylic acid to be contained in the polyester resin used for implementing the present invention may include aromatic dicarboxylic acids such as terephthalic acid, isophthalic acid, naphthalene dicarboxylic acid, and orthophtalic acid; aliphatic dicarboxylic acids such as adipic acid, azelaic acid, sebacic acid, and decanedicarboxylic acid; and alicyclic dicarboxylic acids, or the like.

In cases where an aliphatic dicarboxylic acid (e.g., adipic acid, sebacic acid, decanedicarboxylic acid, etc.) is contained, the content thereof may preferably be less than 3 mol %. The heat-shrinkable polyester film obtained by using polyester containing 3 mol % or more of such an aliphatic dicarboxylic acid would be insufficient in film stiffness as required when attached at high speeds.

In addition, it may be preferable that neither of tri- or higher-valent polybasic carboxylic acids (e.g., trimellitic acid, pyromellitic acid and anhydrates thereof) be contained. The heat-shrinkable polyester film obtained by using polyester containing such a polybasic carboxylic acid would be difficult to make achieve a high ratio of shrinkage as required.

Examples of diol components to be contained in the polyester used for implementing the present invention may include aliphatic diols such as ethylene glycol, 1, 3-propanediol, 1, 4-butanediol, neopentyl glycol, and hexanediol; alicyclic diols such as 1,4-cyclohexanedimethanol; and aromatic diols such as bisphenol A, or the like.

The polyesters for use in the heat-shrinkable polyester film according to the present invention may preferably contain one or more of diols such as cyclic diols such as 1,4-cyclohexanedimethanol, and diols whose carbon number is 3 to 6 (e.g., 1, 3-propanediol, 1, 4-butanediol, neopentyl glycol, hexanediol and the like), with the glass transition temperature (Tg) adjusted to fall within the range of 60° C. to 80° C.

Moreover, the polyesters for use in the heat-shrinkable polyester film according to the present invention may preferably be such that the total content of at least one monomer component capable of forming an amorphous component in the whole polyester resins is more than or equal to 1% but not more than 12%. Since the content of the amorphous component below 1% would make the tenacity of the film insufficient, which means that the film would be liable to rupture upon application of strong tension when treated, the content of 2% or more may be more preferable, and the content of 4 mol % or more may be particularly preferable. The content of the amorphous component more than 12% would make it difficult to suppress the ratio of shrinkage in the low-temperature range, and thus should not be preferable. The content of 10 mol % or less may be more preferable, and the content of 8% or less may be particularly preferable. Examples of the monomer, other than neopentyl glycol, which is capable of forming an amorphous component may include, for example, 1,4-cyclohexanedimethanol and isophthalic acid.

Furthermore, the polyesters for use in the heat-shrinkable polyester film according to the present invention may preferably not contain diols whose carbon number is 8 or greater (e.g., octanediol, and the like), or tri- or higher-valent polyalcohol (e.g., trimethylol propane, trimethylolethane, glycerin, diglycerin, and the like). The heat-shrinkable polyester film obtained by using polyester containing such a diol or polyalcohol would be difficult to make achieve a high ratio of shrinkage as required.

Moreover, the polyesters for use in the heat-shrinkable polyester film according to the present invention may preferably not contain, to the extent possible, diethylene glycol, triethylene glycol or polyethylene glycol. Diethylene glycol, in particular, may likely be present therein because it is a by-product component produced upon polyester polymerization, but the polyesters used for implementing the present invention may preferably have a diethylene glycol content less than 4 mol %.

Moreover, the heat-shrinkable polyester film according to the present invention should necessarily be configured such that a ratio of thermal shrinkage in the longitudinal direction as calculated by the following Equation 1 from the lengths before and after shrinkage effected when the film is treated with no load applied thereto in hot water at 80° C. for a 10-second period (i.e., a ratio of hot-water thermal shrinkage at 80° C.) is more than or equal to 0% but not more than 5%.

$$\text{Thermal\_Shrinkage\_Ratio} = \left\{ \frac{(\text{Length}_{PRE\_SHRINK} - \text{Length}_{POST\_SHRINK})}{\text{Length}_{PRE\_SHRINK}} \right\} \times 100(\%) \quad \text{Eq. 1}$$

The ratio of hot-water thermal shrinkage in the longitudinal direction at 80° C. being below 0% would undesirably make the label loose on the heated drum for activating the thermosensitive adhesive, and thus the label could not be neatly wound around the battery, with the result that the finish of the thermally shrunk label after shrinkage would disadvantageously become poor. On the other hand, the ratio of hot-water thermal shrinkage in the longitudinal direction at 80° C. being more than 5% would undesirably make the label shrink on the heated drum for activating the thermosensitive adhesive, and thus the label could not be neatly wound around the battery at a disadvantage. The upper limit value of the ratio of hot-water thermal shrinkage in the longitudinal direction at 80° C. may be preferably equal to or less than 4%, and more preferably equal to or less than 2%.

Moreover, the heat-shrinkable polyester film according to the present invention should necessarily be configured such that a ratio of thermal shrinkage of the film in the longitudinal direction as calculated by the above Equation 1 from the lengths before and after shrinkage effected when the film is treated with no load applied thereto in a glycerin bath at 140° C. for a 10-second period (i.e., a ratio of glycerin immersion thermal shrinkage at 140° C.) is more than or equal to 30% but not more than 50%.

The ratio of glycerin immersion thermal shrinkage in the longitudinal direction at 140° C. being below 30% would disadvantageously make an amount of shrinkage so small that undesirable wrinkles and/or slack would appear in the label after thermally shrunk; on the other hand, the ratio of glycerin immersion thermal shrinkage in the longitudinal direction at 140° C. being above 50% would make the label in use likely to have undesirable distortion created upon thermal shrinkage when the film is used as a label (shrinkage-derived distortion). The lower limit value of the ratio of glycerin immersion thermal shrinkage in the longitudinal direction at 140° C. may be preferably equal to or more than 32%, more preferably equal to or more than 34%, and particularly preferably equal to or more than 36%. The upper limit value of the ratio of glycerin immersion thermal shrinkage in the longitudinal direction at 140° C. may be preferably equal to or less than 48%, more preferably equal to or less than 46%, and particularly preferably equal to or less than 44%.

Moreover, the heat-shrinkable polyester film according to the present invention should necessarily be configured such that a ratio of thermal shrinkage of the film in the transverse direction (the direction orthogonal to the longitudinal direction) as calculated by the above Equation 1 from the lengths before and after shrinkage effected when the film is treated with no load applied thereto in a glycerin bath at 140° C. for a 10-second period (i.e., a ratio of glycerin immersion thermal shrinkage at 140° C.) is more than or equal to −5% but not more than 10%.

The ratio of glycerin immersion thermal shrinkage in the transverse direction at 140° C. being less than −5% (e.g., −10%) disadvantageously could not provide a good shrunk appearance when the film is used as the label of a battery. On the other hand, the ratio of glycerin immersion thermal shrinkage in the transverse direction at 140° C. being more than 10% would make the label in use likely to have undesirable distortion created upon thermal shrinkage when the film is used as a label (shrinkage-derived distortion). The lower limit value of the ratio of glycerin immersion thermal shrinkage in the transverse direction at 140° C. may be preferably equal to or more than −3%, more preferably equal to or more than −1%, and particularly preferably equal to or more than 1%. The upper limit value of the ratio of glycerin immersion thermal shrinkage in the transverse direction at 140° C. may be preferably equal to or less than 8%, more preferably equal to or less than 6%, and particularly preferably equal to or less than 4%.

Moreover, the heat-shrinkable polyester film according to the present invention may preferably be configured such that a maximum thermal shrinkage stress acting in the longitudinal direction as obtained by a method which will be described later (the maximum thermal shrinkage stress effected when the film is heated from 30° C. to 140° C.) is more than or equal to 2.5 MPa but not more than 20.0 MPa. The maximum thermal shrinkage stress being less than 2.5 MPa disadvantageously could not provide a good shrunk appearance when the film is used as the label of a battery. On the other hand, the maximum thermal shrinkage stress being more than 20.0 MPa would make the label in use likely to have undesirable distortion created upon thermal shrinkage when the film is used as a label (shrinkage-derived distortion). The lower limit value of the maximum thermal shrinkage stress may be preferably equal to or more than 3.0 MPa, more preferably equal to or more than 3.5 MPa, and particularly preferably equal to or more than 4.0 MPa. The upper limit value of the maximum thermal shrinkage stress may be preferably equal to or less than 18.0 MPa, more preferably equal to or less than 16.0 MPa, further preferably equal to or less than 14.0 MPa, and particularly preferably equal to or less than 12.0 MPa.

Moreover, the heat-shrinkable polyester film according to the present invention may preferably be configured such that a ratio of natural shrinkage after aging for a 700-hour or longer period of time in an atmosphere of 40° C.65% RH is more than or equal to 0.05% but not more than 1.5%. The ratio of natural shrinkage may be calculated by the following Equation 4.

$$\text{Natural\_Shrinkage\_Ratio} = \left\{ \frac{(\text{Length}_{PRE\_AGING} - \text{Length}_{POST\_AGING})}{\text{Length}_{PRE\_AGING}} \right\} \times 100(\%) \quad \text{Eq. 4}$$

The ratio of natural shrinkage being more than 1.5% would cause undesirable tightening in the product wound and stored in a roll, which would disadvantageously increase the likelihood of wrinkles occurring in the film roll. Although it is preferable that the ratio of natural shrinkage is smaller, we consider that about 0.05% is the lower limit value in view of precise measurement. The ratio of natural shrinkage may be preferably not more than 1.3%, more preferably not more than 1.1%, and particularly preferably not more than 1.0%.

Moreover, the heat-shrinkable polyester film according to the present invention may preferably be configured such that an index of refraction in the longitudinal direction is more than or equal to 1.600 but not more than 1.630. The index of refraction in the longitudinal direction being more than 1.630 to have a difference increased from the index of refraction in the transverse direction would disadvantageously make the film likely to be cut in the longitudinal direction. On the other hand, the index of refraction in the longitudinal direction being less than 1.600 to have a difference increased from the index of refraction in the transverse direction would disadvantageously make the film likely to be cut in the transverse direction. The upper limit value of the index of refraction in the longitudinal direction may be preferably not more than 1.625, and more preferably not more than 1.620. Furthermore, the lower limit of the index of refraction in the longitudinal direction may be preferably not less than 1.605, and more preferably not less than 1.610.

Moreover, the heat-shrinkable polyester film according to the present invention may preferably be configured such that an index of refraction in the transverse direction is more than or equal to 1.620 but not more than 1.650. The index of refraction in the transverse direction being more than 1.650 to have a difference increased from the index of refraction in the longitudinal direction would disadvantageously make the film likely to be cut in the transverse direction. On the other hand, the index of refraction in the transverse direction being less than 1.620 to have a difference increased from the index of refraction in the longitudinal direction would disadvantageously make the film likely to be cut in the longitudinal direction. The upper limit value of the index of refraction in the transverse direction may be preferably not more than 1.645, and more preferably not more than 1.640. Furthermore, the lower limit value of the index of refraction in the transverse direction may be preferably not less than 1.625, and more preferably not less than 1.630. The indices of refraction in the longitudinal direction and in the transverse direction can be adjusted to fall within a preferable range by taking measures, as will be described later, in the process of manufacturing the film.

In addition, the heat-shrinkable polyester film according to the present invention may preferably be configured such that thickness variations in the longitudinal direction are within a range not more than 25%. The thickness variations beyond 25% would disadvantageously make printing unevenness likely to show up in the printing step in the process of label production, and make shrinkage unevenness likely to show up after thermal shrinkage. The thickness variations in the longitudinal direction may be preferably within a range not more than 20%, and more preferably within a range not more than 15%.

The ratios of thermal shrinkage (the ratio of hot-water thermal shrinkage, the ratio of glycerin immersion thermal shrinkage), the maximum thermal shrinkage stress, the Elmendorf ratio, the rectangular tear strength, the thickness variations in the longitudinal direction, and other properties of the heat-shrinkable film described above can be achieved, using the preferable film compositions as described above, and adopting a preferable production process as will be described below in combination therewith.

The thickness of the heat-shrinkable polyester film according to the present invention is not particularly limited; however, the thickness of the heat-shrinkable polyester film for forming a battery jacket label may be preferably in the range of 10 to 200 μm, and more preferably in the range of 20 to 100 μm.

The heat-shrinkable polyester film according to the present invention may be obtained by melting and extruding a polyester material described above by an extruder to form an unstretched film, and subjecting the unstretched film to biaxial stretching and heat treatment by a method as will be described later.

When a raw stock resin is molten and extruded, the polyester material may preferably be dried using a dryer such as a hopper dryer, a paddle dryer or a vacuum dryer. The polyester material which has been dried in this way is thereafter put through the extruder in which it is molten at a temperature between 200° C. and 300° C. and extruded into a sheet-like form. In this extruding step, any existing methods including the T-die method, the tubular method, etc. may be adopted.

A sheet of molten resin obtained after extrusion is then rapidly cooled; thereby, an unstretched film can be obtained. As a method for rapidly cooling the molten resin, a method for obtaining a substantially unoriented resin sheet by casting the molten resin through a nozzle onto a rotating drum to rapidly cool and solidify the resin can preferably be adopted.

Furthermore, the thus-obtained unstretched film is, as will be described later, stretched in the transverse direction under predetermined conditions, thereafter preliminarily subjected to heat treatment and then stretched in the longitudinal direction under predetermined conditions, so that the heat-shrinkable polyester film according to the present invention can be obtained. Hereinafter, a detailed description will be given of a preferred biaxial stretching and heat treatment method for obtaining a heat-shrinkable polyester film according to the present invention, with consideration given to the difference from the biaxial stretching and heat treatment method for a conventional heat-shrinkable polyester film.

[Preferred Stretching and Heat Treatment Method for Heat-shrinkable Polyester Film]

A conventional heat-shrinkable polyester film is produced by stretching an unstretched film in a direction in which one intends to cause the film to shrink. Although the heat-shrinkable polyester film which shrinks in the longitudinal direction has hitherto been in large demand, the method of doing nothing but simply stretching an unstretched film in the longitudinal direction is underproductive in that a film of great width cannot be produced, and is disadvantageous in that a film having desired evenness in thickness cannot be produced. If the method of stretching beforehand in the transverse direction and thereafter stretching in the longitudinal direction is adopted, disadvantageously, the amount of shrinkage in the longitudinal direction could become insufficient and/or unnecessary shrinkage in the transverse direction could show up. JP 8-244114 A discloses a method for improving a mechanical property in the longitudinal direction wherein an unstretched film is stretched in the order of longitudinal, transverse and longitudinal directions under predetermined conditions; however, a supplementary experiment conducted with a pilot machine of the inventors has shown that a film having a sufficient shrinkability in the longitudinal direction that is a main shrinkage direction cannot be obtained, and wrinkles in the transverse direction becomes likely to occur in the produced film roll. In addition, it has been shown that the increase in draw ratio so as to increase the shrinkability in the longitudinal direction (the draw ratio at the first stage of stretching in the longitudinal direction or the draw ratio at the second stage of stretching in the longitudinal direction) causes a lot of ruptures in the film at a time of the last stretching in the longitudinal direction, and it should thus be difficult to continuously perform a stable production. Moreover, the film obtained in the aforementioned supplementary experiment has a high ratio of natural shrinkage and thus wrinkles in the longitudinal direction occur in the film roll produced. Additionally, it has been shown that the film obtained in the aforementioned supplementary experiment has a high ratio of thermal shrinkage in a low temperature range (approximately 60° C.-80° C.) and is thus not suitable for use in a jacket label of a battery.

The inventors have conceived that the method of stretching in the longitudinal direction after stretching biaxially in the longitudinal and transverse directions as disclosed in JP 8-244114 A is at a disadvantage to achieve its purpose of increasing the amount of shrinkage in the longitudinal direction in consequence, and a method of stretching in the longitudinal direction simply after stretching in the transverse direction should yield a better result. Thus, an exhaustive study has been done as to how the ratios of thermal shrinkage in the longitudinal direction and natural shrinkage of the film vary according to the conditions in each step of the stretching process in adopting the method of stretching in the longitudinal direction after stretching in the transverse direction (this method will hereinafter be referred to simply as "transverse-longitudinal stretching method").

Furthermore, the inventors have conceived that the thermal shrinkage behavior of the film should essentially be controlled by heat treatment provided after biaxial stretching operation in order to keep the ratio of thermal shrinkage low in a low-temperature range (approximately 60° C.-80° C.) and increase the ratio of thermal shrinkage in a high-temperature range (130° C.-150° C.), and have thoroughly studied the manner in which the thermal shrinkage behavior of the film in the longitudinal direction varies in accordance with the conditions in the final heat treatment step.

As a result, it has been shown that, as described above, by using a polyester resin comprising ethylene terephthalate as a major constituent and containing at least one monomer component (e.g., neopentyl glycol) capable of forming an amorphous component wherein a monomer component content in a glycol component is neither less than 1 mol % nor more than 12 mol %, and adopting the measures (1)-(3) in the film production by the transverse-longitudinal stretching method, the stable production of the film can be performed continuously whereas the ratio of shrinkage in the longitudinal direction in the low-temperature range (60° C.-80° C.) can be kept low and the ratio of shrinkage in the high-temperature range (130° C.-150° C.) can be increased. Besides, it has been shown that the measures listed below yield surprising associated effects such that the ratio of natural shrinkage of the film becomes smaller, the tensile strength of the film is enhanced and the finally produced film roll becomes unlikely to acquire wrinkles. The inventors have devised the present invention based upon these findings.

(1) Control of the shrinkage stress after stretching in the transverse direction (2) Interruption of heating between stretching in the transverse direction and intermediate heat treatment (3) Final heat treatment after stretching in the longitudinal direction The measures listed above will now be described in sequence.

(1) Control of the Shrinkage Stress after Stretching in the Transverse Direction In the film production by the transverse-longitudinal stretching method according to the present invention, the unstretched film should necessarily be stretched in the transverse direction and thereafter subjected to a heat treatment (hereinafter referred to as intermediate heat treatment) at a temperature higher than or equal to 90° C. but not higher than 130° C. for a period of time longer than or equal to 1.0 second but not longer than 10.0 seconds. Through this intermediate heat treatment, the film which produces no shrinkage unevenness when it is made into a label can be obtained. The lower limit of the temperature in the heat treatment may be preferably equal to or higher than 95° C., and more preferably equal to or higher than 100° C. The upper limit of the temperature in the heat treatment may be preferably equal to or lower than 125° C., and more preferably equal to or lower than 120° C. On the other hand, the period of time for the heat treatment should be adjusted within a range longer than or equal to 1.0 second but not longer than 10.0 seconds appropriately in accordance with the material composition.

The stretching of an unstretched film in the transverse direction may preferably be performed, with both edges of the film facing in the transverse directions being held by clips in a tenter, in such a manner that the film is stretched by a factor of neither less than 1.8 nor more than 6.0 in the transverse direction at a temperature of neither lower than Tg nor higher than Tg+40° C. The temperature for stretching being lower than Tg should be undesirable in that rupture would likely occur during stretching; on the other hand, the temperature higher than Tg+40° C. should be undesirable in that thickness variations in the transverse direction would appear to an undesirable extent. The lower limit of the temperature for transverse stretching may be preferably equal to or higher than Tg+3° C., and more preferably equal to or higher than Tg+6° C. The upper limit of the temperature for transverse stretching may be preferably equal to or lower than Tg+35° C., and more preferably equal to or lower than Tg+30° C. The stretching in the transverse direction carried out by a factor less than 1.8 would disadvantageously be not only low in productivity but also likely to produce thickness variations in the transverse direction to an undesirable extent. On the other hand, the stretching in the transverse direction carried out by a factor more than 6.0 would disadvantageously be likely to cause rupture during stretching as well as require an enormous energy and large-scale equipment for relaxation, and thus be low in productivity. The lower limit of the factor for the transverse stretching may preferably be 3.0 or more, and more preferably 3.5 or more. The upper limit of the factor for the transverse stretching may preferably be 5.5 or less, and more preferably 5.0 or less.

(2) Interruption of Heating Between Stretching in the Transverse Direction and Intermediate Heat Treatment In the film production by the transverse-longitudinal stretching method according to the present invention, as described above, essentially, the transverse stretching should be followed by the intermediate heat treatment. Between the transverse stretching and the intermediate heat treatment, the film should necessarily be passed through an intermediate zone in which no active heating operation is carried out, for a period of time longer than or equal to 0.5 second but not longer than 3.0 seconds. That is to say, though it is preferable in view of the production cost that the transverse stretching and the intermediate heat treatment be carried out in one and the same tenter, it is preferable, in the film production according to the present invention, that the intermediate zone be provided between a transverse stretching zone and a heat treatment zone in that tenter. In addition, it is preferable that hot air to the intermediate zone from the stretching zone and from the heat treatment zone be shut out in such a manner that a rectangular sheet of paper suspended in the intermediate zone with no film being passed therethrough droops straight down substantially direct in the vertical direction. Further, it is preferable, in the film production according to the present invention, that the transversely stretched film be introduced into the intermediate zone, and passed through the intermediate zone for a predetermined period of time. The time shorter than 0.5 second for passing the film through the intermediate zone may be undesirable in that the hot air in the transverse stretching zone would be entrained in a stream accompanying the film passing therethrough and enter the heat set zone, with the result that temperature control for the intermediate heat treatment in the heat set zone should become difficult. On the other hand, 3.0 seconds or so may be sufficient for passing the film through the intermediate zone, and a period of time longer than that may be undesirable in that such an extra period of time makes a waste of equipment. The lower limit of the time for passing the film through the intermediate zone may be preferably not shorter than 0.7 second, and more preferably not shorter than 0.9 second. The upper limit for passing the film through the intermediate zone may be preferably not longer than 2.5 seconds, and more preferably not longer than 2.0 seconds.

The film after subjected to the intermediate heat treatment may preferably be cooled to a temperature higher than or equal to 30° C. but not higher than 70° C. Cooling the film to a temperature not higher than 30° C. would disadvantageously require large-scale equipment, and thus should lower the productivity. The temperature not lower than 70° C. would disadvantageously allow the physical properties of the film to be changed by a tension or the like applied thereto after the tenter step, and thus should make its management difficult. The lower limit of the film temperature after cooling may be preferably equal to or higher than 33° C., and more preferably equal to or higher than 36° C. The upper limit of the film temperature may be preferably equal to or lower than 65° C., and more preferably equal to or lower than 60° C.

In the film production by the transverse-longitudinal stretching method according to the present invention, thick portions (mainly the portions held by the clips when the film is transversely stretched) at the both edges of the film which have not sufficiently stretched transversely may preferably be trimmed before the film subjected to the intermediate heat treatment is stretched in the longitudinal direction. To be more specific, preferably, the portions which are located at the left and right edges of the film and are approximately 1.1 to 1.3 times thicker than the central portion are trimmed by cutting and removing the thicker portions at the edges of the film using a cutter or any other tool, and only the remaining portion is stretched in the longitudinal direction. When the edges of the film are trimmed as described above, the film before trimming may preferably be cooled so that the surface temperature of the film is not higher than 50° C. By cooling the film in this way, the trimming can be carried out without disturbing the cut end face. Although the trimming of the film edges can be performed using a prevailing cutter or the like, the use of a circular blade having a circumferential cutting edge may be preferable because the use of such a circular blade makes it possible to prevent the edge from being locally blunted, so that the cutter can continue to cut the film edges for a long period of time and rupture would not be induced when the film is stretched in the longitudinal direction. The trimming of the edges of the film before stretching in the longitudinal direction in a manner as described above makes it possible to easily draw the film once heat-set, evenly in the longitudinal direction, so that stable and continuous film production without rupture can be carried out easily. In addition, the film which shrinks largely in the longitudinal direction (main shrinking direction) can be obtained easily.

The film subjected to the intermediate treatment should necessarily be stretched in the longitudinal direction by a longitudinal stretching machine, by a factor of neither less than 1.5 nor more than 4.0 at a temperature of neither lower than Tg nor higher than Tg+80° C. The temperature for stretching being lower than Tg should be undesirable in that rupture would occur during stretching; on the other hand, the temperature higher than Tg+80° C. should be undesirable in that thickness variations in the longitudinal direction would appear to an undesirable extent. The lower limit of the temperature for transverse stretching may be preferably equal to or higher than Tg+3° C., and more preferably equal to or higher than Tg+6° C. The upper limit of the temperature for longitudinal stretching may be preferably equal to or lower than Tg+75° C., and more preferably equal to or lower than Tg+70° C. On the other hand, the stretching in the longitudinal direction carried out by a factor less than 1.5 would disadvantageously be not only low in productivity but also likely to produce thickness variations in the longitudinal direction to an undesirable extent. On the other hand, the stretching in the longitudinal direction carried out by a factor more than 4.0 would disadvantageously be likely to cause rupture during stretching. The lower limit of the factor for the longitudinal stretching may preferably be 1.6 or more, and more preferably 1.8 or more. The upper limit of the factor for the longitudinal stretching may be preferably 3.5 or less, and more preferably 3.0 or less.

(3) Final Heat Treatment after Stretching in the Longitudinal Direction

In the film production by the transverse-longitudinal stretching method according to the present invention, after the transverse stretching and the subsequent intermediate heat treatment, the stretching in the longitudinal direction is carried out, as described above, and thereafter the film of which both edges facing in the transverse directions are held by clips in a tenter should be subjected to a heat treatment at a temperature higher than or equal to 110° C. but not higher than 160° C. for a period of time longer than or equal to 1.0 second but not longer than 10.0 seconds (hereinafter referred to as final heat treatment). By this final heat treatment, the film that does not shrink in either of the longitudinal or transverse direction in the low-temperature range when made into a jacket label of a battery can be obtained. The lower limit of the temperature for the final heat treatment may be preferably equal or higher than 125° C., and more preferably equal or higher than 130° C. The upper limit of the temperature for the final heat treatment may be preferably not higher than 145° C., and more preferably not higher than 140° C. On the other hand, the period of time for the final heat treatment should be adjusted within a range longer than or equal to 1.0 second but not longer than 10.0 seconds appropriately in accordance with the material composition.

It is not to be understood that only any specific one of the measures (1)-(3) described above effectively contribute to the low heat shrinkability in the low-temperature range (60° C.-80° C.), high heat shrinkability in the high-temperature range (130° C.-150° C.), good mechanical properties in the transverse direction, low ratio of natural shrinkage, stable film-formation, capability of withstanding stress without rupture, and the like, but it is to be understood that the combination of the measures (1)-(3) can very efficiently realize the low heat shrinkability in the low-temperature range, high heat shrinkability in the high-temperature range, good mechanical properties in the transverse direction, low ratio of natural shrinkage, stable film-formation, capability of withstanding stress without rupture, and the like.

As described above, the heat-shrinkable polyester film according to the present invention is produced by the aforementioned transverse-longitudinal stretching method; however, a stretching method which further includes the step(s) of stretching in the longitudinal or transverse direction before and/or after the main step of transverse-longitudinal stretching may be adopted as well, as long as the method can realize the measures (1)-(3) described above.

EXAMPLES

The present invention will hereinbelow be demonstrated in detail by examples, but it is appreciated that the present invention is not limited to specific embodiments as will be demonstrated in the examples, and modifications can be made thereto where appropriate, without departing the gist of the present invention. The properties and compositions of the materials used in the examples and comparative examples, and the film production conditions (the conditions for stretching and heat treatment, etc.) of the examples and comparative examples are shown in TABLE 1 and TABLE 2.

TABLE 1

COMPOSITION & PROPERTY, etc. OF RESIN MATERIAL

| | Resin composition | Total ratio of monomer component forming amorphous component (mol %) |
|---|---|---|
| Example 1 | Polyester 1:Polyester 2 = 25:75 | 7.5 |
| Example 2 | Polyester 1:Polyester 2 = 25:75 | 7.5 |
| Example 3 | Polyester 1:Polyester 2 = 25:75 | 7.5 |
| Example 4 | Polyester 1:Polyester 2 = 7:93 | 2.1 |
| Example 5 | Polyester 1:Polyester 2 = 33:67 | 9.9 |
| Example 6 | Polyester 1:Polyester 5 = 25:75 | 7.5 |
| Comparative Example 1 | Polyester 3 = 100 | 0 |
| Comparative Example 2 | Polyester 1:Polyester 2 = 70:30 | 21 |
| Comparative Example 3 | Polyester 1:Polyester 2:Polyester 4 = 55:35:10 | 16.5 |
| Comparative Example 4 | Polyester 1:Polyester 2 = 25:75 | 7.5 |
| Comparative Example 5 | Polyester 1:Polyester 2 = 25:75 | 7.5 |

TABLE 2

| | Stretching Conditions | | | | | | |
|---|---|---|---|---|---|---|---|
| | | Stretching at first stage | | | Time for passing thru intermediate zone (second) | Intermediate heat treatment (Heat treatment before stretching at second stage) | |
| | Stretching method | Stretching direction | Temperature (° C.) | Draw ratio | | Temperature (° C.) | Time (second) |
| Example 1 | Transverse-Longitudinal | Transverse | 85 | 3.3 | 1.2 | 105 | 6.0 |
| Example 2 | Transverse-Longitudinal | Transverse | 85 | 3.3 | 1.2 | 105 | 6.0 |
| Example 3 | Transverse-Longitudinal | Transverse | 85 | 3.7 | 1.2 | 105 | 6.0 |
| Example 4 | Transverse-Longitudinal | Transverse | 85 | 3.3 | 1.2 | 105 | 6.0 |
| Example 5 | Transverse-Longitudinal | Transverse | 85 | 3.7 | 1.2 | 105 | 6.0 |
| Example 6 | Transverse-Longitudinal | Transverse | 85 | 3.3 | 1.2 | 105 | 6.0 |
| Comparative Example 1 | Longitudinal-Transverse | Longitudinal | 80 | 3.4 | — | — | — |
| Comparative Example 2 | Transverse-Longitudinal | Transverse | 80 | 3.7 | 1.2 | 105 | 6.0 |
| Comparative Example 3 | Longitudinal | Longitudinal | 75 | 3.0 | — | — | — |
| Comparative Example 4 | Transverse-Longitudinal | Transverse | 85 | 3.3 | 1.2 | 105 | 6.0 |
| Comparative Example 5 | Transverse-Longitudinal | Transverse | 85 | 3.7 | 1.2 | 105 | 6.0 |

| | Stretching Conditions | | | | | Relaxation ratio in transverse direction in final heat treatment |
|---|---|---|---|---|---|---|
| | Film temperature after intermediate heat treatment (° C.) | Stretching at second stage | | Final heat treatment | | |
| | | Stretching direction | Temperature (° C.) | Draw ratio | Temperature (° C.) | Time (second) |
| Example 1 | 40.0 | Longitudinal | 95 | 2.0 | 140 | 5.0 | 0 |
| Example 2 | 40.0 | Longitudinal | 95 | 2.0 | 135 | 5.0 | 0 |
| Example 3 | 40.0 | Longitudinal | 95 | 2.0 | 130 | 5.0 | 0 |
| Example 4 | 40.0 | Longitudinal | 100 | 2.0 | 125 | 5.0 | 0 |
| Example 5 | 40.0 | Longitudinal | 95 | 2.0 | 130 | 5.0 | 0 |
| Example 6 | 40.0 | Longitudinal | 95 | 2.0 | 140 | 5.0 | 0 |

TABLE 2-continued

| | | | | | | | |
|---|---|---|---|---|---|---|---|
| Comparative Example 1 | — | Transverse | 150 | 4.5 | 235 | 10.0 | 3 |
| Comparative Example 2 | 40.0 | Longitudinal | 75 | 2.4 | 115 | 5.0 | 15 |
| Comparative Example 3 | — | — | — | — | — | — | — |
| Comparative Example 4 | 40.0 | Longitudinal | 95 | 2.0 | 135 | 5.0 | 10 |
| Comparative Example 5 | 40.0 | Longitudinal | 95 | 2.0 | 130 | 5.0 | −10 |

The method of evaluation of each film is as follows.

[Ratio of Hot-Water Thermal Shrinkage]

Film was cut into a square form of 10 cm×10 cm, and caused to thermally shrink by treatment in hot water at a predetermined temperature (80° C.)±0.5° C. for 10 seconds with no load applied thereto; thereafter, the dimensions of the film in the longitudinal and transverse directions were measured, and the ratio of thermal shrinkage was determined for each example by applying Equation 1. The main shrinking direction was assigned to the direction having the greater ratio of thermal shrinkage (in all of the Examples 1-6 and Comparative examples 1-5, to their longitudinal directions).

[Ratio of Glycerin Immersion Thermal Shrinkage]

Film was cut into a square form of 10 cm×10 cm, and caused to thermally shrink by treatment in a glycerin bath at 140° C.±0.5° C. for 10 seconds with no load applied thereto; thereafter, the dimensions of the film in the longitudinal and transverse directions were measured, and the ratio of thermal shrinkage was determined for each example by applying Equation 1. The main shrinking direction was assigned to the direction having the greater ratio of thermal shrinkage (in all of the Examples 1-6 and Comparative examples 1-5, to their longitudinal directions).

[Tg (Glass Transition Temperature)]

5 mg of unstretched film was heated to raise the temperature from −40° C. to 120° C. at a temperature increasing rate of 10° C./minute, and an endothermic curve in this process was obtained using the differential scanning calorimeter (Model: DSC220) manufactured by Seiko Instruments Inc. Tg (glass transition temperature) was set at a point of intersection of tangents stretched before and after the point of inflection of the endothermic curve.

[Maximum Thermal Shrinkage Stress]

A film sample having a size of (longitudinal dimension)×(transverse direction)=20 mm×4 mm was held using a thermomechanical analyzer (Model: TMA-60) manufactured by Shimadzu Corporation, between a pair of chucks (distance between the chucks=10 mm) of the analyzer, with the longitudinal direction of the film oriented in a direction of a line extending between the chucks, and was heated to raise the temperature from room temperature (approximately 30° C.) to 180° C. at a temperature increasing rate of 10° C./minute. From the largest value of the load generated in this process, a shrinkage stress per unit area in cross section of the film was calculated, and the value was assigned to the maximum thermal shrinkage stress.

[Ratio of Natural Shrinkage]

The film obtained was trimmed into a size of (main shrinking direction dimension)×(orthogonal direction dimension)=200 mm×30 mm, and left for 700 hours (of aging) in an atmosphere of 40° C.65% RH; thereafter, an amount of shrinkage in the main shrinking direction of the film (the direction in which the ratio of thermal shrinkage represents the maximum value; the longitudinal direction in examples 1-6 as well as comparative examples 1-5) was measured, and a ratio of natural shrinkage was calculated by applying Equation 4.

[Index of Refraction in Thickness Direction and Transverse Direction]

Each sample film was left for two-hour or longer period of time in an atmosphere of 23° C., 65% RH, and thereafter put through "Abbe Refractometer Model 4T" manufactured by Atago Co., Ltd. for measurement.

[Finished Shrinkage Quality]

The heat-shrinkable film as thus obtained was trimmed into a size of length 105 mm×width 40 mm in such a manner that the length orients in the longitudinal direction of the film. A double-faced tape was then adhered to an outer peripheral surface at an upper end of R20 battery, and the film as thus trimmed was wound around the battery on the outer face of the double-faced tape in such a manner as shown in FIG. 1 that one of the longer sides of the film extends 3 mm beyond the edge of the battery. Hot air at 200° C. (at the rate of 10 m/second) was applied continuously for 10 seconds to the battery having the film wound therearound, so that the film shrunk. Thereafter, the finished shrinkage quality was visually checked, and rated on the three scales as follows.

○: Almost no shrinkage loss/unevenness observed
Δ: Shrinkage being insufficient and significantly uneven
X: Almost no shrinkage observed

[Tensile Strength for Withstanding Stress Without Rupture]

The film was trimmed into a size of 10 cm×10 cm, and the film was placed on a sponge. Thereafter, a substantially central spot of the film placed on the sponge was pierced with a triangle chisel (edge size: 4.5 mm). When the film was pierced, the triangle chisel is adjusted so as to have the line connecting both ends of the V-shaped edge aligned with the transverse direction of the film. The 20 film samples were subjected to the aforementioned piercing experiment, and the number of samples in which "tear in the longitudinal direction (the direction orthogonal to the transverse direction)" were observed (see FIG. 2) at a spot corresponding to the vertex of the V-shaped cut formed upon piercing was counted, and its ratio (percentage) was calculated to give a tear occurrence ratio, so that the samples were rated on the three scales as follows.

○: The tear occurrence ratio being lower than 30%
Δ: The tear occurrence ratio being not lower than 30% but lower than 60%
X: The tear occurrence ratio being not lower than 60%

[Heat Resistance]

The film was trimmed into a size of 10 cm×10 cm, and the film was placed for 5 seconds on a metal plate heated at 90° C.; then, the state of the film surface was visually observed, and rated on the two scales as follows.

○: No change observed, or curled but no significant unevenness observed
X: Shrinkage and unevenness observed Polyester used in Examples and Comparative examples are as follows.

Polyester 1: polyethylene terephthalate (intrinsic viscosity=0.75 dl/g)

Polyester 2: polyester composed of 70 mol % of ethylene glycol, 30 mol % of neopentyl glycol, and terephthalic acid (intrinsic viscosity=0.72 dl/g)

Polyester 3: polyethylene terephthalate (intrinsic viscosity=0.62 dl/g)

Polyester 4: polyester composed of 100 mol % of butanediol, and terephthalic acid (intrinsic viscosity=0.72 dl/g)

Polyester 5: polyester composed of 70 mol % of ethylene glycol, 30 mol % of 1,4-cyclohexanedimethanol, and terephthalic acid (intrinsic viscosity=0.75 dl/g)

Example 1

Polyester 1 and polyester 2 specified above were mixed at a weight ratio of 75:25 and charged into an extruder. Thereafter, the mixed resin was molten at 280° C., extruded from T-die, wound around a rotating metal roll cooled at the surface temperature of 30° C. and thereby quenched, so that an unstretched film having a thickness of 200 μm was obtained. At this step, the take-up speed (rotation speed of the metal roll) of the unstretched film was approximately 20 m/minute, and Tg of the unstretched film was 76° C. Thereafter, the unstretched film was introduced into a tenter (first tenter) in which a transverse stretching zone, an intermediate zone and an intermediate heat treatment zone were provided contiguously. In this tenter, the intermediate zone located between the transverse stretching zone and the intermediate heat treatment zone was configured to have a length of approximately 40 cm. In the intermediate zone, hot air from the stretching zone and hot air from the heat treatment zone were shut out so that a rectangular sheet of paper suspended in the intermediate zone with no film being passed therethrough drooped straight down substantially direct in the vertical direction.

The unstretched film introduced into the tenter was preliminarily heated until the film temperature reached 90° C., then stretched in the transverse direction at 85° C. by a factor of 3.3 in the transverse stretching zone, passed through the intermediate zone (time for passing therethrough=approximately 1.2 seconds), thereafter introduced into the intermediate heat treatment zone, and subjected therein to heat treatment at a temperature of 105° C. for 6.0 seconds, to thereby obtain a transverse monoaxially stretched film having a thickness of 60 μm. The surface temperature of the film measured immediately after passing through the intermediate heat treatment zone was approximately 40° C. Thereafter, the transverse monoaxially stretched film was cut along its edges (portions approximately 1.2 times thicker than the central portion of the film were trimmed) to continuously remove the portions of the film located outside the lines along which the film was cut, using a pair of left and right trimming devices (composed of circular blades having circumferential edges) located downstream of the tenter.

Furthermore, the film from which the edges were trimmed as described above was introduced into a longitudinal stretching machine having a plurality of rolls continuously arranged, in which the film was preliminarily heated on a preheat roll until the film temperature reached 80° C. and thereafter stretched by a factor of 2.0 between stretching rolls of which the surface temperature was set at 95° C. Thereafter, the longitudinally stretched film was forcedly cooled by a cooling roll of which the surface temperature was set at 25° C. The surface temperature of the film before cooling was approximately 85° C., and the surface temperature of the film after cooling was approximately 25° C. The time required for cooling from 70° C. to 25° C. was approximately 1.0 second, and the speed at which the film was cooled was 45° C./second.

Then, the film thus cooled was introduced into a tenter (second tenter). In the second tenter, the film was subjected to heat treatment in an atmosphere of 140° C. for 5.0 seconds with both edges thereof facing in the transverse directions being held by clips, and then cooled and cut to remove the both edges, whereby an approximately 30 μm-thick biaxially stretched film was formed continuously to a predetermined length and a film roll composed of a heat-shrinkable polyester film was obtained. The properties of the film thus obtained were evaluated by the method described above. The results of evaluation are shown in TABLE 3.

Example 2

Except for the temperature for the final heat treatment in the second tenter changed to 135° C., the same process as in Example 1 was applied, and a film roll was obtained by winding up a predetermined length of an approximately 30 μm-thick biaxially stretched film (heat-shrinkable film). The properties of the film thus obtained were evaluated by the method described above. The results of evaluation are shown in TABLE 3.

Example 3

Except for the traverse stretching factor in the first tenter changed to 3.7 and the temperature for the final heat treatment in the second tenter changed to 130° C., the same process as in Example 1 was applied, and a film roll was obtained by winding up a predetermined length of an approximately 30 μm-thick biaxially stretched film (heat-shrinkable film). The properties of the film thus obtained were evaluated by the method described above. The results of evaluation are shown in TABLE 3.

Example 4

Except for the ratio of mixing of polyester 1 and polyester 2 to be charged into the extruder changed to the weight ratio of 7:93, the traverse stretching factor in the first tenter changed to 3.7, the temperature of the stretching rolls for longitudinal stretching changed to 100° C. and the temperature for the final heat treatment in the second tenter changed to 125° C., the same process as in Example 1 was applied, and a film roll was obtained by winding up a predetermined length of an approximately 30 μm-thick biaxially stretched film (heat-shrinkable film). Tg of the unstretched film was 67° C. The properties of the film thus obtained were evaluated by the method described above. The results of evaluation are shown in TABLE 3.

Example 5

Except for the ratio of mixing of polyester 1 and polyester 2 to be charged into the extruder changed to the weight ratio of 33:67, the traverse stretching factor in the first tenter changed to 3.7 and the temperature for the final heat treatment in the second tenter changed to 135° C., the same process as in Example 1 was applied, and a film roll was obtained by winding up a predetermined length of an approximately 30 μm-thick biaxially stretched film (heat-shrinkable film). Tg of the unstretched film was 68° C. The properties of the film thus obtained were evaluated by the method described above. The results of evaluation are shown in TABLE 3.

Example 6

Except for the polyester to be charged into the extruder changed from polyester 2 to polyester 5, the same process as in Example 1 was applied, and a film roll was obtained by winding up a predetermined length of an approximately 30 μm-thick biaxially stretched film (heat-shrinkable film). Tg of the unstretched film was 77° C. The properties of the film thus obtained were evaluated by the method described above. The results of evaluation are shown in TABLE 3.

Comparative Example 1

An unstretched film was obtained in such a manner as in Example 1 except for the material to be charged into the extruder changed to polyester 3 mentioned above (Tg of the unstretched film was 75° C.). The unstretched film thus obtained was introduced into the longitudinal stretching machine, in which the film was preliminarily heated on a preheat roll until the film temperature reached 70° C. and thereafter stretched by a factor of 3.4 between the stretching rolls of which the surface temperature was set at 80° C. Thereafter, the longitudinally stretched film was introduced into a tenter in which a transverse stretching zone and a heat treatment zone were provided; therein the film was preliminarily heated until the film temperature reached 100° C., then stretched in the transverse direction at 150° C. by a factor of 4.5 in the transverse stretching zone, and thereafter subjected to heat treatment at a temperature of 235° C. for 10.0 seconds while being relaxed by 3% in the transverse direction, whereby a film roll was obtained by winding up a predetermined length of an approximately 30 μm-thick biaxially stretched film (heat-shrinkable film). The properties of the film thus obtained were evaluated by the method described above. The results of evaluation are shown in TABLE 3.

Comparative Example 2

A film roll made by winding up a predetermined length of an approximately 30 μm-thick biaxially stretched film (heat-shrinkable film) was obtained in such a manner as in Example 1 except for the ratio of mixing of polyester 1 and polyester 2 to be charged into the extruder changed to the weight ratio of 70:30, the transverse stretching temperature and the traverse stretching factor in the first tenter changed to 80° C. and 3.7, respectively, the longitudinal stretching temperature and the longitudinal stretching factor in the longitudinal stretching machine changed to 75° C. and 2.4, respectively, the film being relaxed by 10% in the transverse direction in the intermediate heat treatment zone, and the temperature for the final heat treatment in the second tenter changed to 115° C. (Tg of the unstretched film was 75° C.). The properties of the film thus obtained were evaluated by the method described above. The results of evaluation are shown in TABLE 3.

Comparative Example 3

A 90 μm-thick unstretched film (Tg of the unstretched film was 70° C.) was obtained in such a manner as in Example 1 except for the materials to be charged into the extruder changed to the mixture of polyester 1, polyester 2 and polyester 4 mixed at a weight ratio of 55:35:10. The unstretched film thus obtained was introduced into the longitudinal stretching machine, in which the film was preliminarily heated on a preheat roll until the film temperature reached 70° C. and thereafter stretched by a factor of 3.0 between the stretching rolls of which the surface temperature was set at 85° C., whereby a film roll was obtained by winding up a predetermined length of an approximately 30 μm-thick biaxially stretched film (heat-shrinkable film). The properties of the film thus obtained were evaluated by the method described above. The results of evaluation are shown in TABLE 3.

Comparative Example 4

Except that when a longitudinally stretched film obtained by the same method as in Example 1 was introduced into the second tenter to subject the film to a final heat treatment therein, the film was relaxed in the transverse direction by 10%, the same process as in Example 1 was applied, and a film roll was obtained by winding up a predetermined length of an approximately 30 μm-thick biaxially stretched film (heat-shrinkable film). The properties of the film thus obtained were evaluated by the method described above. The results of evaluation are shown in TABLE 3.

Comparative Example 5

Except that when a longitudinally stretched film obtained by the same method as in Example 1 was introduced into the second tenter to subject the film to a final heat treatment therein, the film was stretched in the transverse direction by a factor of 1.1, the same process as in Example 1 was applied, and a film roll was obtained by winding up a predetermined length of an approximately 30 μm-thick biaxially stretched film (heat-shrinkable film). The properties of the film thus obtained were evaluated by the method described above. The results of evaluation are shown in TABLE 3.

TABLE 3

Properties of heat-shrinkable film

| | Ratio of hot-water thermal shrinkage at 80° C. (%) | | Ratio of glycerin immersion thermal shrinkage at 140° C. (%) | | Index of refraction | | Maximum thermal shrinkage stress (MPa) | Ratio of natural shrinkage (%) | Tensile strength | Heat resistance | Finished shrinkage quality |
|---|---|---|---|---|---|---|---|---|---|---|---|
| | Main shrinking direction | Orthogonal direction | Main shrinking direction | Orthogonal direction | Main shrinking direction | Orthogonal direction* | | | | | |
| Example 1 | 1.0 | 0.3 | 35.0 | 2.0 | 1.614 | 1.639 | 7.3 | 0.3 | ○ | ○ | ○ |
| Example 2 | 1.0 | 0.3 | 40.0 | 0 | 1.610 | 1.635 | 8.5 | 0.3 | ○ | ○ | ○ |
| Example 3 | 1.8 | 0.5 | 45.0 | 1.0 | 1.609 | 1.633 | 7.8 | 0.3 | ○ | ○ | ○ |
| Example 4 | 1.0 | 0.3 | 38.0 | 0 | 1.620 | 1.645 | 11.0 | 0.3 | ○ | ○ | ○ |

TABLE 3-continued

| | Ratio of hot-water thermal shrinkage at 80° C. (%) | | Ratio of glycerin immersion thermal shrinkage at 140° C. (%) | | Index of refraction | | Maximum thermal shrinkage stress (MPa) | Ratio of natural shrinkage (%) | Tensile strength | Heat resistance | Finished shrinkage quality |
|---|---|---|---|---|---|---|---|---|---|---|---|
| | Main shrinking direction | Orthogonal direction | Main shrinking direction | Orthogonal direction | Main shrinking direction | Orthogonal direction* | | | | | |
| Example 5 | 3.0 | 0.5 | 40.0 | 0 | 1.607 | 1.623 | 6.5 | 0.3 | ○ | ○ | ○ |
| Example 6 | 1.0 | 0.3 | 34.0 | 4.0 | 1.619 | 1.650 | 5.8 | 0.3 | ○ | ○ | ○ |
| Comparative Example 1 | 0 | 0 | 1.0 | 0 | 1.636 | 1.685 | — | 0.1 | ○ | ○ | X |
| Comparative Example 2 | 17 | −2 | 43.0 | 1.0 | 1.577 | 1.577 | — | 0.5 | ○ | X | — |
| Comparative Example 3 | 20 | 1.0 | 67.0 | 8.0 | 1.630 | 1.561 | — | 0.5 | X | X | — |
| Comparative Example 4 | 1.0 | 0.3 | 36.0 | −6.0 | 1.614 | 1.634 | 8.1 | 0.3 | ○ | ○ | X |
| Comparative Example 5 | 1.0 | 0.5 | 36.0 | 12.0 | 1.612 | 1.642 | 8.6 | 0.3 | ○ | ○ | X |

Orthogonal direction*: Direction orthogonal to the main shrinking direction

As evident from TABLE 3, the films obtained in Examples 1-6 exhibited a high ratio of thermal shrinkage in the high-temperature range (the ratio of glycerin immersion thermal shrinkage) irrespective of a low ratio of thermal shrinkage in the low-temperature range (the ratio of hot-water thermal shrinkage), and were outstanding for the finished shrinkage quality. Furthermore, the heat-shrinkable polyester films of Examples 1-6 exhibited a small ratio of natural shrinkage, caused no wrinkle in the film rolls manufactured therefrom, and well withstood stress without rupture. To sum up, the heat-shrinkable polyester films obtained in Examples 1-6 marked a high quality level required for a jacket label of a battery, and thus were of great practical utility.

In contrast, the heat-shrinkable film (longitudinally-and-transversely-stretched film) obtained in Comparative example 1 was low in the ratio of thermal shrinkage in the high-temperature range, and thus inferior in finished shrinkage quality. The heat-shrinkable polyester film obtained in Comparative example 2 was high in the ratio of thermal shrinkage in the low-temperature range, and thus low in heat resistance. On the other hand, the heat-shrinkable polyester film obtained in Comparative example 3 was low in the ratio of thermal shrinkage in the low-temperature range, and thus insufficient in tensile strength. In addition, the heat-shrinkable polyester film obtained in Comparative example 4 was too low in the ratio of thermal shrinkage in the orthogonal direction in the high-temperature range, and the heat-shrinkable polyester film obtained in Comparative example 5 was too high in the ratio of thermal shrinkage in the orthogonal direction in the high-temperature range, and thus both inferior in finished shrinkage quality. In short, the heat-shrinkable polyester films obtained in Comparative examples 1-5 were practically not suitable for use in a jacket label of a battery.

INDUSTRIAL APPLICABILITY

The heat-shrinkable polyester film according to the present invention possesses the excellent processing properties as described above, and is therefore suitable for use in a jacket label of a battery or similar applications.

EXPLANATION OF REFERENCE CHARACTERS

F—film, V—battery

Figure 1:
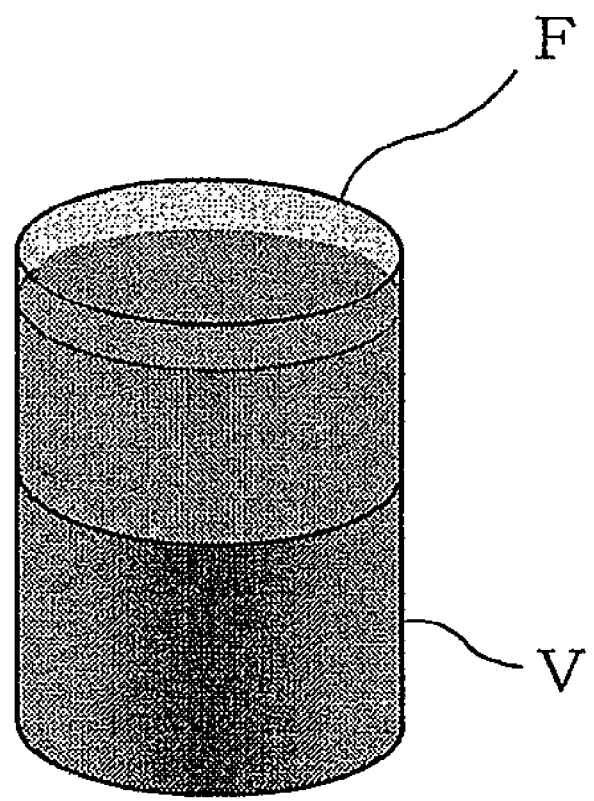
FIG. 1 is an explanatory illustration of a sample film wound around an outer surface of an upper edge portion of a battery, prepared for evaluation of finished shrinkage quality.
Figure 2:
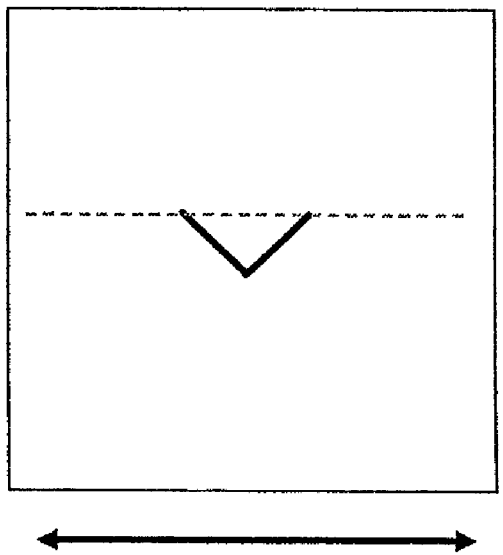
FIG. 2 is an explanatory illustration of a sample film having "tear in the longitudinal direction", in evaluation of tensile strength for withstanding stress without rupture.
Figure 2:
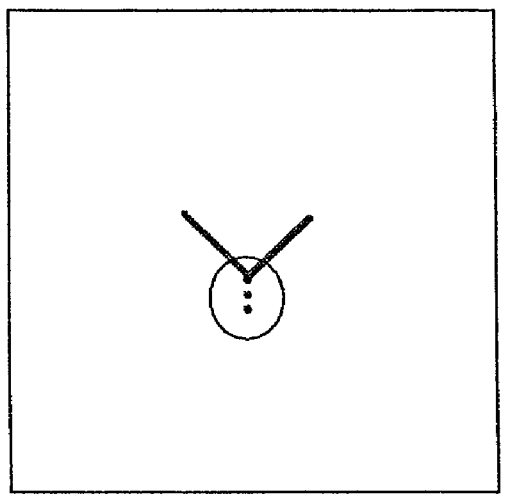

The invention claimed is:

1. A heat-shrinkable polyester film made of a polyester resin comprising ethylene terephthalate as a major constituent and containing at least one monomer component capable of forming an amorphous component as a glycol component being neither less than 1 mol % nor more than 12 mol %, wherein the heat-shrinkable polyester film shaped to extend longitudinally with a certain transverse dimension has a main shrinking direction being in a longitudinal direction thereof, and satisfies the following requirements (1)-(3):
  (1) a ratio of hot-water shrinkage in the longitudinal direction is more than or equal to 0% but not more than 5% where the heat-shrinkable polyester film is put in hot water at 80° C. for 10 seconds;
  (2) a ratio of shrinkage in the longitudinal direction is more than or equal to 30% but not more than 50% where the heat-shrinkable polyester film is put in a glycerin bath heated at 140° C. for 10 seconds; and
  (3) a ratio of shrinkage in a transverse direction orthogonal to the longitudinal direction is more than or equal to −5% but not more than 10% where the heat-shrinkable polyester film is put in a glycerin bath heated at 140° C. for 10 seconds.

2. The heat-shrinkable polyester film according to claim 1, wherein the monomer component capable of forming an amorphous component contains at least one of neopentyl glycol, 1,4-cyclohexanedimethanol and isophthalic acid.

3. The heat-shrinkable polyester film according to claim 1, wherein an index of refraction in the longitudinal direction is more than or equal to 1.600 but not more than 1.630, and an index of refraction in the transverse direction is more than or equal to 1.620 but not more than 1.650.

4. The heat-shrinkable polyester film according to claim 1, wherein a maximum thermal shrinkage stress acting in the longitudinal direction responsive to heating from 30° C. to 150° C. is more than or equal to 2.5 MPa but not more than 20.0 MPa.

5. The heat-shrinkable polyester film according to claim 1, wherein a ratio of natural shrinkage after aging for a 700-hour or longer period of time in an atmosphere of 40° C.65% RH is more than or equal to 0.05% but not more than 1.5%.

6. A process for continuously producing the heat-shrinkable polyester film according to claim 1, the process comprising:

stretching an unstretched film, of which both edges in the transverse directions are held by clips in a tenter, by neither less than 1.8 times nor more than 6.0 times in the transverse direction at a temperature of neither lower than Tg nor higher than Tg+40° C.; then, passing the film through an intermediate zone in which no active heating operation is carried out; subjecting the film to a heat treatment at a temperature higher than or equal to 90° C. but not higher than 130° C. for a period of time longer than or equal to 1.0 second but not longer than 10.0 seconds; thereafter, cooling the film until a surface temperature thereof falls to a temperature higher than or equal to 30° C. but not higher than 70° C.; trimming portions at the both edges of the film facing in the transverse directions and held by the clips; then, stretching the film by a factor of neither less than 1.5 nor more than 4.0 in the longitudinal direction at a temperature of neither lower than Tg nor higher than Tg+80° C.; and thereafter, subjecting the film, of which both edges facing in the transverse directions are held by clips in a tenter, to a heat treatment at a temperature higher than or equal to 110° C. but not higher than 160° C. for a period of time longer than or equal to 1.0 second but not longer than 10.0 seconds.

7. A process for continuously producing the heat-shrinkable polyester film according to claim 2, the process comprising:

stretching an unstretched film, of which both edges in the transverse directions are held by clips in a tenter, by neither less than 1.8 times nor more than 6.0 times in the transverse direction at a temperature of neither lower than Tg nor higher than Tg+40° C.; then, passing the film through an intermediate zone in which no active heating operation is carried out; subjecting the film to a heat treatment at a temperature higher than or equal to 90° C. but not higher than 130° C. for a period of time longer than or equal to 1.0 second but not longer than 10.0 seconds; thereafter, cooling the film until a surface temperature thereof falls to a temperature higher than or equal to 30° C. but not higher than 70° C.; trimming portions at the both edges of the film facing in the transverse directions and held by the clips; then, stretching the film by a factor of neither less than 1.5 nor more than 4.0 in the longitudinal direction at a temperature of neither lower than Tg nor higher than Tg+80° C.; and thereafter, subjecting the film, of which both edges facing in the transverse directions are held by clips in a tenter, to a heat treatment at a temperature higher than or equal to 110° C. but not higher than 160° C. for a period of time longer than or equal to 1.0 second but not longer than 10.0 seconds.

8. A process for continuously producing the heat-shrinkable polyester film according to claim 3, the process comprising:

stretching an unstretched film, of which both edges in the transverse directions are held by clips in a tenter, by neither less than 1.8 times nor more than 6.0 times in the transverse direction at a temperature of neither lower than Tg nor higher than Tg+40° C.; then, passing the film through an intermediate zone in which no active heating operation is carried out; subjecting the film to a heat treatment at a temperature higher than or equal to 90° C. but not higher than 130° C. for a period of time longer than or equal to 1.0 second but not longer than 10.0 seconds; thereafter, cooling the film until a surface temperature thereof falls to a temperature higher than or equal to 30° C. but not higher than 70° C.; trimming portions at the both edges of the film facing in the transverse directions and held by the clips; then, stretching the film by a factor of neither less than 1.5 nor more than 4.0 in the longitudinal direction at a temperature of neither lower than Tg nor higher than Tg+80° C.; and thereafter, subjecting the film, of which both edges facing in the transverse directions are held by clips in a tenter, to a heat treatment at a temperature higher than or equal to 110° C. but not higher than 160° C. for a period of time longer than or equal to 1.0 second but not longer than 10.0 seconds.

9. A process for continuously producing the heat-shrinkable polyester film according to claim 4, the process comprising:

stretching an unstretched film, of which both edges in the transverse directions are held by clips in a tenter, by neither less than 1.8 times nor more than 6.0 times in the transverse direction at a temperature of neither lower than Tg nor higher than Tg+40° C.; then, passing the film through an intermediate zone in which no active heating operation is carried out; subjecting the film to a heat treatment at a temperature higher than or equal to 90° C. but not higher than 130° C. for a period of time longer than or equal to 1.0 second but not longer than 10.0 seconds; thereafter, cooling the film until a surface temperature thereof falls to a temperature higher than or equal to 30° C. but not higher than 70° C.; trimming portions at the both edges of the film facing in the transverse directions and held by the clips; then, stretching the film by a factor of neither less than 1.5 nor more than 4.0 in the longitudinal direction at a temperature of neither lower than Tg nor higher than Tg+80° C.; and thereafter, subjecting the film, of which both edges facing in the transverse directions are held by clips in a tenter, to a heat treatment at a temperature higher than or equal to 110° C. but not higher than 160° C. for a period of time longer than or equal to 1.0 second but not longer than 10.0 seconds.

10. A process for continuously producing the heat-shrinkable polyester film according to claim 5, the process comprising:

stretching an unstretched film, of which both edges in the transverse directions are held by clips in a tenter, by neither less than 1.8 times nor more than 6.0 times in the transverse direction at a temperature of neither lower than Tg nor higher than Tg+40° C.; then, passing the film through an intermediate zone in which no active heating operation is carried out; subjecting the film to a heat treatment at a temperature higher than or equal to 90° C. but not higher than 130° C. for a period of time longer than or equal to 1.0 second but not longer than 10.0 seconds; thereafter, cooling the film until a surface temperature thereof falls to a temperature higher than or equal to 30° C. but not higher than 70° C.; trimming portions at the both edges of the film facing in the transverse directions and held by the clips; then, stretching the film by a factor of neither less than 1.5 nor more than 4.0 in the longitudinal direction at a temperature of neither lower than Tg nor higher than Tg+80° C.; and thereafter, subjecting the film, of which both edges facing in the transverse directions are held by clips in a tenter, to a heat treatment at a temperature higher than or equal to 110° C. but not higher than 160° C. for a period of time longer than or equal to 1.0 second but not longer than 10.0 seconds.

* * * * *